US005231201A

United States Patent [19]

Welsh et al.

[11] Patent Number: 5,231,201

[45] Date of Patent: Jul. 27, 1993

[54] MODIFIED CAUSTIC REFINING OF GLYCERIDE OILS FOR REMOVAL OF SOAPS AND PHOSPHOLIPIDS

[75] Inventors: William A. Welsh, Highland; James M. Bogdanor, Columbia, both of Md.

[73] Assignee: W. R. Grace & Co.-Conn., New York, N.Y.

[21] Appl. No.: 564,912

[22] Filed: Aug. 8, 1990

Related U.S. Application Data

[63] Continuation-in-part of Ser. No. 212,802, Jun. 29, 1988, abandoned, which is a continuation-in-part of Ser. No. 863,208, May 14, 1986, abandoned.

[51] Int. Cl.[5] .................. C07B 51/43

[52] U.S. Cl. .................. 554/191; 554/192

[58] Field of Search .................. 260/427; 554/192, 191; 252/369

[56] References Cited

U.S. PATENT DOCUMENTS

| | | | |
|---|---|---|---|
| 3,284,213 | 11/1966 | Van Akkeren | 426/329 |
| 3,955,004 | 5/1976 | Strauss | 260/427 |
| 4,298,622 | 11/1981 | Singh et al. | 426/254 |
| 4,330,564 | 5/1982 | Friedman | 426/417 |
| 4,629,588 | 12/1986 | Welsh | 260/427 |
| 4,734,226 | 3/1988 | Parker et al. | 554/176 |

FOREIGN PATENT DOCUMENTS

| | | |
|---|---|---|
| 0079799 | of 1983 | European Pat. Off. . |
| 228889 | of 1926 | United Kingdom . |
| 612169 | of 1948 | United Kingdom . |
| 865807 | of 1961 | United Kingdom . |
| 1522149 | of 1978 | United Kingdom . |

OTHER PUBLICATIONS

Brown et al., "Adsorption of Soy Oil Phospholipids on Silica", Amer. Oil Chemists Journal, 1984 pp.1-15.

Brekke, Handbook of Soy Oil Processing and Utilization Erickson et al. editors, Amer. Soybean Assoc.-/AOCS Chap. 8, 1980.

Gutfinger et al., "Pretreatment of Soybean Oil for Physical Refining Evaluation of Efficiency of Various Adsorbents in Removing Phosphlipids and Pigments"; JAOCS Chem. Soc.; vol. 55/ pp. 856-859; 1978.

Erickson et al. (Editors); "Handbook of Soy Oil Processing and Utilization"; American Soybean Assoc.-/AOCS; Chap. 7 & 8; 1980.

Christenson; "Degumming and Caustic Refining"; AOCS; May, 1983.

Brown et al.; "Adsorption of Soy Oil Phospholipids on Silica"; Amer. Oil Chemists Journal; 1984.

Woerful re Soapstock; World Conference on emerging Technologies in the Fats and Oils Industry; AOCS; 1985.

JAOCS, vol. 63, No. 2 (February 1986) - p. 166 (Soapstock).

*Primary Examiner*—José G. Dees

*Assistant Examiner*—Joseph Conrad, III

*Attorney, Agent, or Firm*—Steven Capella

[57] ABSTRACT

Adsorbents comprising amorphous silicas with effective average pore diameters of up to about 5000 Angstroms are useful in processes for the removal of soaps and phospholipids (along with associated metal ions) from caustic treated, primary centrifuged, water-wash centrifuged or caustic refined glyceride oils.

21 Claims, 2 Drawing Sheets

MODIFIED CAUSTIC REFINING OF GLYCERIDE OILS FOR REMOVAL OF SOAPS AND PHOSPHOLIPIDS

This application is a continuation-in-part of co-pending patent application U.S. Ser. No. 212,802 filed on Jun. 29, 1988, now abandoned, which in turn is a continuation-in-part of patent application U.S. Ser. No. 863,208 filed on May 14, 1986 (now abandoned).

BACKGROUND OF THE INVENTION

This invention relates to a method for refining glyceride oils by contacting the oils with an adsorbent capable of removing certain impurities. More specifically, it has been found that amorphous silicas are quite effective in adsorbing both soaps and phospholipids from caustic treated or caustic refined glyceride oils, to produce oil products with substantially lowered concentrations of these impurities. For purposes of this specification, the term "impurities" refers to soaps and phospholipids. The phospholipids are associated with metal ions and together they will be referred to as "trace contaminants." The term "glyceride oils" as used herein is intended to encompass both vegetable and animal oils. The term is primarily intended to describe the so-called edible oils, i.e., oils derived from fruits or seeds of plants and used chiefly in foodstuffs, but it is understood that oils whose end use is as non-edibles are to be included as well. The invention is applicable to oils which have been subjected to caustic treatment, which is the refining step in which soaps are formed in the oil.

The terms "glyceride oil," "crude glyceride oil," "degummed oil," "caustic refined oil," "oil" and the like as used herein refer to the oil itself, including impurities and contaminants such as those discussed in this specification. These are substantially pure oils at about 99.8% or higher oil content (*Handbook of Soy Oil Processing and Utilization*, pp. 55–56 (1980)). This contrasts to solvent/oil solutions, or miscella as referred to by the industry. The initial oil extraction process in which oils are removed from seeds typically is done by solvent extraction (e.g., with hexane). The result is a solvent/oil solution which may be 70–75% solvent. Refining methods which utilize this solution commonly are referred to as miscella refining. This invention does not cover miscella refining. The glyceride oils utilized in the process described below are substantially pure oils, in the complete absence or substantially complete absence of solvents such as hexane. Thus, the method of this invention can be categorized as non-miscella refining.

Crude glyceride oils, particularly vegetable oils, are refined by a multi-stage process, the first step of which typically is "degumming" or "desliming" by treatment with water or with a chemical such as phosphoric acid, citric acid or acetic anhydride. This treatment removes some but not all gums and certain other contaminants. Some of the phosphorus content of the oil is removed with the gums. Either crude or degummed oil may be treated in a chemical, or caustic, refining process. The addition of an alkali solution, caustic soda for example, to a crude or degummed oil causes neutralization of free fatty acids to form soaps. This step in the refining process will be referred to herein as "caustic treatment" and oils treated in this manner will be referred to as "caustic treated oils. Soaps generated during caustic treatment are an impurity which must be removed from the oil because they have a detrimental effect on the flavor and stability of the finished oil. Moreover, the presence of soaps is harmful to the catalysts used in the oil hydrogenation process.

Current industrial practice is to first remove soaps by centrifugal separation (referred to as "primary centrifugation"). In this specification, oils which have been subjected to caustic treatment and primary centrifugation will be referred to as "primary centrifuged" oil. Conventionally, the primary centrifuged oil, which still has significant soap content, is subjected to a water wash, which dissolves the soaps from the oil phase into the aqueous phase. The two phases are separated by centrifugation, although complete separation of the phases is not possible, even under the best of conditions. The light phase discharge is water-washed oil which now has reduced soap content and may be referred to as "water-wash centrifuged" oil. The heavy phase is a dilute soapy water solution. Frequently, the water wash and centrifugation steps must be repeated in order to reduce the soap content of the oil below about 50 ppm. This fully water-wash centrifuged oil will be referred to herein as "caustic refined" oil. The water-washed oil then must be dried to remove residual moisture to below about 0.1 weight percent. The dried oil is then either transferred to the bleaching process or is shipped or stored as once-refined oil.

A significant part of the waste discharge from the caustic refining of vegetable oil results from the water wash process used to remove soaps. In fact, a primary reason for refiners' use of the physical refining process is to avoid the wastestream production associated with removal of soaps generated in the caustic refining process: since no caustic is used in physical refining, no soaps are generated. In addition, in the caustic refining process, some oil is lost in the water wash process. In the caustic refining process to which this invention relates, moreover, the dilute soapstock must be treated before disposal, typically with an inorganic acid such as sulfuric acid in a process termed acidulation. Sulfuric acid is frequently used. It can be seen that quite a number of separate unit operations make up the soap removal process, each of which results in some degree of oil loss. The removal and disposal of soaps and aqueous soapstock is one of the most considerable problems associated with the caustic refining of glyceride oils.

In addition to removal of soaps created in the caustic refining process, phosphorus-containing trace contaminants must be removed from the oil. The presence of these trace contaminants can lend off colors, odors and flavors to the finished oil product. These compounds are phospholipids, with which are associated ionic forms of the metals calcium, magnesium, iron and copper. For purposes of this invention, references to the removal or adsorption of phospholipids is intended also to refer to removal or adsorption of the associated metal ions. Adsorption of phosphorus on various adsorbents (for example, bleaching earth) has been practiced but only with respect to oils undergoing physical refining (in which no soaps are generated) or in caustic refining subsequent to water wash steps (in which the soaps are removed). No adsorption process has accomplished the removal of both soaps and phospholipids at an early stage of caustic refining where large quantities of soaps are present.

SUMMARY OF THE INVENTION

A simple physical adsorption process has been found whereby soaps and phospholipids can be removed from caustic treated, primary centrifuged, water-wash centrifuged or caustic refined vegetable oils in a single unit operation. This unique process completely eliminates the need to subject caustic treated oil to a water washing process in order to remove soaps. It also eliminates the need for a separate adsorption process to reduce the phospholipid content of the oil. The process described herein utilizes amorphous silica adsorbents preferably having an average pore diameter of greater than 50 to 60A which can remove all or substantially all soaps from the oil and which reduce the phospholipid content on the oil to at least below 15 parts per million, preferably below 5 parts per million, most preferably substantially to zero.

It is the primary object of this invention to introduce a single unit operation into the caustic refining of glyceride oils which both eliminates soap and reduces the phospholipid content of oils to acceptable levels. Adsorption of soaps and phospholipids (together with associated contaminants) onto amorphous silica in the manner described offers tremendous advantage in caustic refining by eliminating the several unit operations required when conventional water-washing, centrifugation and drying are employed to remove soaps from the oils. In addition, this method eliminates the need for wastewater treatment and disposal from those operations. Over and above the cost savings realized from this tremendous simplification of the oil processing, the overall value of the product is increased since a significant by-product of conventional caustic refining is dilute aqueous soapstock, which is of very low value and requires substantial treatment before disposal is permitted by environmental authority.

It is also intended that use of the method of this invention may reduce or potentially eliminate the need for bleaching earth treatment. In this invention only one adsorption step is used for removal of both soaps and phospholipids. Additional treatment with bleaching earth to remove these impurities typically will not be required. Reduction or elimination of an additional bleaching earth step will result in substantial oil conservation as this step typically results in significant oil loss. Moreover, since spent bleaching earth has a tendency to undergo spontaneous combustion, reduction or elimination of this step will yield an occupationally and environmentally safer process.

An additional object of the invention is to simplify the recovery costs and processing now associated with preparation of the aqueous soapstock for use in the animal feed industry. The spent silica adsorbent can be used in animal feeds either as is or after acidulation to convert the soaps into free fatty acids. The need in the conventional caustic refining process for drying or concentrating the dilute soapstock is eliminated by this invention.

DETAILED DESCRIPTION OF THE INVENTION

It has been found that amorphous silicas are particularly well suited for removing both soaps and phospholipids from various caustic treated glyceride oils. The process for the removal of these impurities, as described in detail herein, essentially comprises the steps of selecting a caustic treated, primary centrifuged, water-wash centrifuged or caustic refined glyceride oil whose impurities comprise soaps and phospholipids, selecting an adsorbent which comprises a suitable amorphous silica, contacting the oil and the adsorbent, allowing the soaps and phospholipids to be adsorbed onto the amorphous silica, and separating the adsorbent-treated oil from the adsorbent.

By the process of this invention soaps and phospholipids can be removed from oils in a single adsorption step. The soaps do not "blind" the adsorbent to the phospholipids. Moreover, it has been found that the presence of increasing levels of soap in the oil to be treated actually enhances the capacity of amorphous silica to adsorb phosphorus. That is, the presence of soaps at levels below the maximum adsorbent capacity of the silica makes it possible to substantially reduce phosphorus content at lower silica usage than required in the absence of soaps.

The Oils

Figure 1:
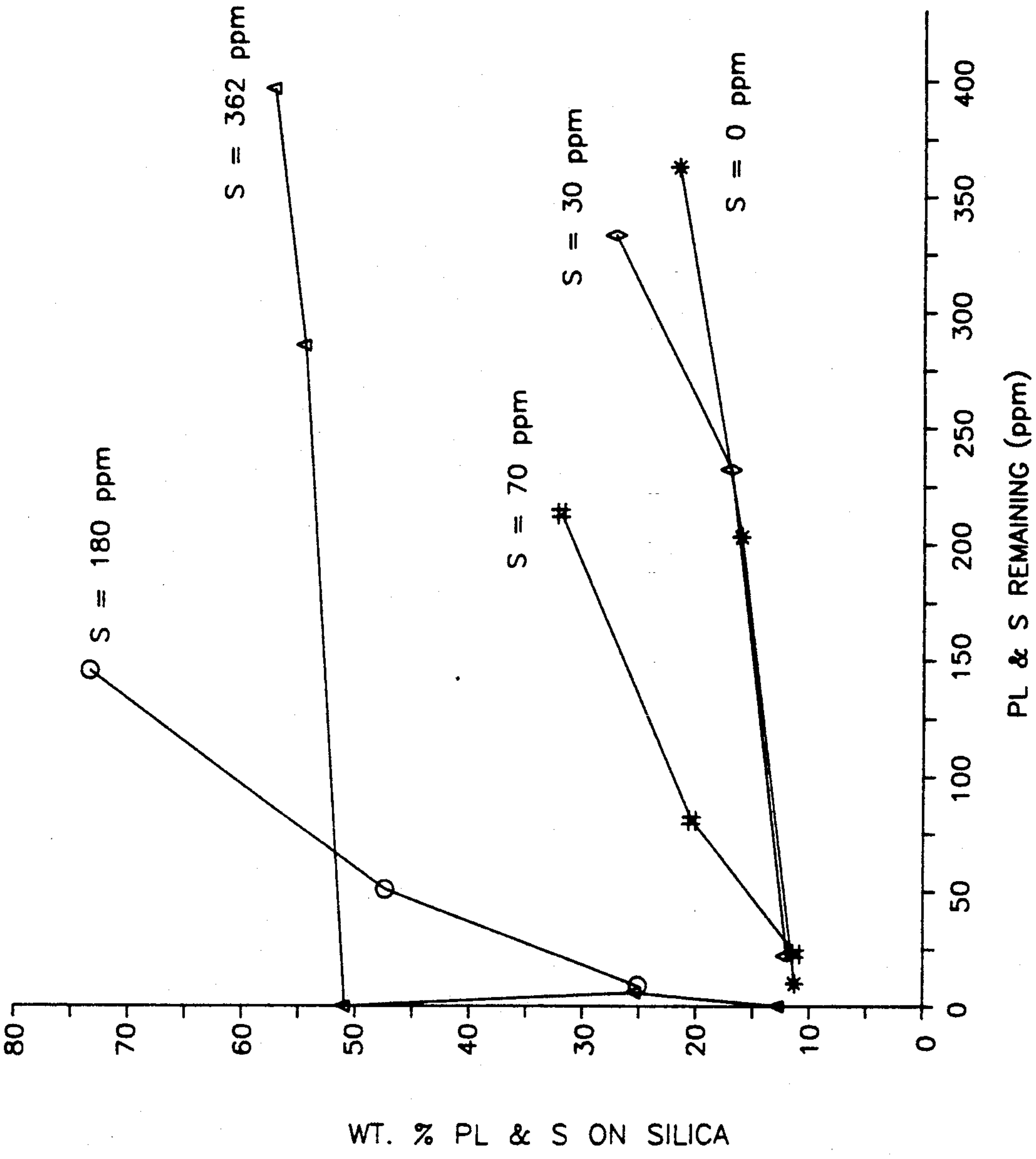
FIG. 1 is a graphic representation of adsorption isotherms for the capacity of amorphous silica for combined phospholipids and soaps. The isotherms are based on the results of Example II as shown in Table V.

The process described herein can be used for the removal of phospholipids from any caustic treated glyceride oil, for example, oils of soybean, peanut, rapeseed, corn, sunflower, palm, coconut, olive, cottonseed, etc. As stated above, the oils used in this process are completely or substantially completely free of solvents. The caustic refining process involves the neutralization of the free fatty acid content of crude or degummed oil by treatment with bases, such as sodium hydroxide or sodium carbonate, which typically are used in aqueous solution. The neutralized free fatty acid present as the alkali or alkaline earth salt is defined as soap. The soap content of caustic treated oil will vary depending on the free fatty content of the unrefined oil. Values disclosed as typical in the industry are stated as about 300 ppm soap for caustic treated primary centrifuged oil (Erickson, Ed., Handbook of Soy Oil Processing and Utilization, Chapter 7, "Refining," p. 91 (1980)), but in practice, soap levels at this stage may range up to 500 to 1000 ppm. Conventional separation (primary centrifuge) and water wash centrifuge processes remove about 90% of the soap content generated by the caustic treatment step. Levels of about 10–50 ppm soap are taught for caustic refined oil (that is, caustic treated oil that has been primary centrifuged and fully water washed) (Christenson, Short Course, Processing and Quality Control of Fats and Oils, FIG. 1, presented at Amer. Oil Chemists' Soc. (May 5–7, 1983). These values are summarized in Table I. Fully refined oils must have soap values approaching zero. The process disclosed herein will reduce soaps to levels acceptable to the industry, that is, less than about 10 ppm, preferably less than about 5 ppm, most preferably about zero ppm, without the use of water wash steps.

Removal of trace contaminants (phospholipids and associated metal ions) from edible oils also is a significant step in the oil refining process because they can cause off colors, odors and flavors in the finished oil. Typically, the acceptable concentration of phosphorus in the finished oil product should be less than about 15.0 ppm, preferably less than about 5.0 ppm, according to general industry practice. As an illustration of the refining goals with respect to trace contaminants, typical phosphorus levels in soybean oil at various stages of chemical refining are shown in Table I.

TABLE I[1]

| Stage | Trace Contaminant Levels (ppm) P | Ca | Mg | Fe | Cu | Soaps (ppm) |
|---|---|---|---|---|---|---|
| Crude Oil | 450–750 | 1–5 | 1–5 | 1–3 | .03–.05 | 0 |
| Degummed Oil | 60–200 | 1–5 | 1–5 | .4–.5 | .02–.04 | 0 |
| Caustic Treated Oil[2] | 60–750 | 1–5 | 1–5 | .4–.3 | .02–.05 | 7500–12,500 |
| Primary Centrifuged Oil | 60–200 | 1–5 | 1–5 | .4–.5 | .02–.04 | 300–1,000 |
| Caustic Refined Oil[3] | 10–15 | 1 | 1 | 0.3 | .003 | 10–50 |
| End Product | 1–15 | 1 | 1 | .1–.3 | .003 | 0 |

[1]Data assembled from the Handbook of Soy Oil Processing and Utilization, Table I, p. 14, p. 91, p. 119, p. 294 (1980); from FIG. 1 from Christenson, Short Course: Processing and Quality Control of Fats and Oils, presented at American Oil Chemists' Society, Lake Geneva, WI (May 5-7, 1983); and from field data.
[2]Either Crude Oil or Degummed Oil may be used to prepare Caustic Treated Oil.
[3]As used in the table, "Caustic Refined Oil" has been primary centrifuged and fully water washed.

In addition to phospholipid removal, the process of this invention also removes from edible oils ionic forms of the metals calcium, magnesium, iron and copper, which are believed to be chemically associated with phospholipids, and which are removed in conjunction with the phospholipids. These metal ions themselves have a deleterious effect on the refined oil products. Calcium and magnesium ions can result in the formation of precipitates, particularly with free fatty acids, resulting in undesired soaps in the finished oil. The presence of iron and copper ions promote oxidative instability. Moreover, each of these metal ions is associated with catalyst poisoning where the refined oil is catalytically hydrogenated. Typical concentrations of these metals in soybean oil at various stages of chemical refining are shown in Table I. Throughout the description of this invention, unless otherwise indicated, reference to the removal of phospholipids is meant to encompass the removal of associated metal ions as well.

The Adsorption Process—The amorphous silicas described below exhibit very high capacity for adsorption of soaps and phospholipids. The capacity of the silica for phospholipids is improved with increasing soap levels in the starting oil, provided that sufficient silica is used to obtain adsorbent-treated oil with soap levels of approximately 30 ppm or less. It is when the residual soap levels (in the adsorbent-treated oil) fall below about 30 ppm that the increased capacity of the silica for phospholipid adsorption is seen. It is believed that the total available adsorption capacity of amorphous silica is about 50 to 75 wt. % on a dry basis.

The silica usage should be adjusted so that the total soap and phospholipid content of the caustic treated, primary centrifuged, water-washed centrifuged or caustic refined oil does not exceed about 50 to 75 wt. % of the silica added on a dry basis. The maximum adsorption capacity observed in a particular application is expected to be a function of the specific properties of the silica used, the oil type and stage of refinement, and processing conditions such as temperature, degree of mixing and silica-oil contact time. Calculations for a specific application are well within the knowledge of a person of ordinary skill as guided by this specification.

The adsorption step itself is accomplished by contacting the amorphous silica and the oil, preferably in a manner which facilitates the adsorption. The adsorption step may be by any convenient batch or continuous process which provides for direct contact of the oil and the silica adsorbent. No solvent is employed to aid the adsorption. In any case, agitation or other mixing will enhance the adsorption efficiency of the silica.

The adsorption can be conducted at any convenient temperature at which the oil is a liquid. The oil and amorphous silica are contacted as described above for a period sufficient to achieve the desired levels of soap and phospholipid in the treated oil. The specific contact time will vary somewhat with the selected process, i.e., batch or continuous. In addition, the adsorbent usage, that is, the relative quantity of adsorbent brought into contact with the oil, will affect the amount of soaps and phospholipids removed. The adsorbent usage is quantified as the weight percent of amorphous silica (on a dry weight basis after ignition at 1750° F.), calculated on the basis of the weight of the oil processed. The preferred adsorbent usage is at least about 0.01 to about 1.0 wt. %, dry basis, most preferably at least about 0.1 to about 0.15 wt. %, dry basis.

As seen in the Examples, significant reduction in soap and phospholipid content is achieved by the method of this invention. The soap content and the phosphorus content of the treated oil will depend primarily on the oil itself, as well as on the silica, usage, process, etc. For example, by reference to Table I, it will be appreciated that the initial soap content will vary significantly depending whether the oil is treated by this adsorption method following caustic treatment or following primary centrifugation or water-wash centrifugation. Similarly, the phosphorus content will be somewhat reduced following degumming, caustic treatment and/or primary centrifuge. However, phosphorus levels of less than 15 ppm, preferably less than 5.0 ppm, and most preferably less than 1.0 ppm, and soap levels of less than 50 ppm, preferably less than about 10 ppm and most preferably substantially zero ppm, can be achieved by this adsorption method.

Following adsorption, the soap and phospholipid enriched silica is removed from the adsorbent-treated oil by any convenient means, for example, by filtration or centrifugation. The oil may be subjected to additional finishing processes, such as steam refining, bleaching and/or deodorizing. With low phosphorus and soap levels, it may be feasible to use heat bleaching instead of a bleaching earth step, which is associated with significant oil losses. Even where bleaching earth operations are to be employed, simultaneous or sequential treatment with amorphous silica and bleaching earth provides an extremely efficient overall process. By first using the method of this invention to decrease the soap and phospholipid content, and then treating with bleaching earth, the effectiveness of the latter step is increased. Therefore, either the quantity of bleaching earth required can be significantly reduced, or the bleaching earth will operate more effectively per unit weight. The spent silica may be used in animal feed, either as is, or following acidulation to reconvert the soaps into fatty acids. Alternatively, it may be feasible to elute the adsorbed impurities from the spent silica in order to re-cycle the silica for further oil treatment.

The Adsorbent

The term "amorphous silica" as used herein is intended to embrace silica gels, precipitated silicas, dialytic silicas and fumed silicas in their various prepared or activated forms. Both silica gels and precipitated silicas are prepared by the destabilization of aqueous silicate solutions by acid neutralization. In the preparation of silica gel, a silica hydrogel is formed which then typically is washed to low salt content. The washed hydrogel may be milled, or it may be dried, ultimately to the point where its structure no longer changes as a result of shrinkage. The dried, stable silica is termed a xerogel. In the preparation of precipitated silicas, the destabilization is carried out in the presence of polymerization inhibitors, such as inorganic salts, which cause precipitation of hydrated silica. The precipitate typically is filtered, washed and dried. For preparation of gels or precipitates useful in this invention, it is preferred to initially dry the gel or precipitate to the desired water content. Alternatively, they can be dried and then water can be added to reach the desired water content before use. Dialytic silica is prepared by precipitation of silica from a soluble silicate solution containing electrolyte salts (e.g., $NaNO_3$, $Na_2SO_4$, $KNO_3$) while electrodialyzing, as described in U.S. Pat. No. 4,508,607 (Winyall). Fumed silicas (or pyrogenic silicas) are prepared from silicon tetrachloride by high-temperature hydrolysis, or other convenient methods. The specific manufacturing process used to prepare the amorphous silica is not expected to affect its utility in this method.

In the preferred embodiment of this invention, the silica adsorbent will have the highest possible surface area in pores which are large enough to permit access to the soap and phospholipid molecules, while being capable of maintaining good structural integrity upon contact with the oil. The requirement of structural integrity is particularly important where the silica adsorbents are used in continuous flow systems, which are susceptible to disruption and plugging. Amorphous silicas suitable for use in this process have surface areas of up to about 1200 square meters per gram, preferably between 100 and 1200 square meters per gram. It is preferred, as well, for as much as possible of the surface area to be contained in pores with diameters greater than 50 to 60A, although amorphous silicas with smaller pore diameters may be used. In particular, partially dried amorphous silica hydrogels having an average pore diameter less than 60A (i.e., down to about 20A) and having a moisture content of at least about 25 weight percent will be suitable.

The method of this invention utilizes amorphous silicas with substantial porosity contained in pores having diameters greater than about 50 to 60A, as defined herein, after appropriate activation. Activation typically is accomplished by heating to temperatures of about 450° to 700° F. in vacuum. One convention which describes silicas is average pore diameter ("APD"), typically defined as that pore diameter at which 50% of the surface area or pore volume is contained in pores with diameters greater than the stated APD and 50% is contained in pores with diameters less than the stated APD. Thus, in amorphous silicas suitable for use in the method of this invention, at least 50% of the pore volume will be in pores of at least 50 to 60A diameter. Silicas with a higher proportion of pores with diameters greater than 50 to 60A will be preferred, as these will contain a greater number of potential adsorption sites. The practical upper APD limit is about 5000A.

Silicas which have measured intraparticle APDs within the stated range will be suitable for use in this process. Alternatively, the required porosity may be achieved by the creation of an artificial pore network of interparticle voids in the 50 to 5000A range. For example, non-porous silicas (i.e., fumed silica) can be used as aggregated particles. Silicas, with or without the required porosity, may be used under conditions which create this artificial pore network. Thus the criterion for selecting suitable amorphous silicas for use in this process is the presence of an "effective average pore diameter" greater than 50 to 60A. This term includes both measured intraparticle APD and interparticle APD, designating the pores created by aggregation or packing of silica particles.

The APD value (in Angstroms) can be measured by several methods or can be approximated by the following equation, which assumes model pores of cylindrical geometry:

$$APD\,(A) = \frac{40{,}000 \times PV\,(\text{cc/gm})}{SA\,(\text{m}^2/\text{gm})}, \quad (1)$$

where PV is pore volume (measured in cubic centimeters per gram) and SA is surface area (measured in square meters per gram).

Both nitrogen and mercury porosimetry may be used to measure pore volume in xerogels, precipitated silicas and dialytic silicas. Pore volume may be measured by the nitrogen Brunauer-Emmett-Teller ("B-E-T") method described in Brunauer et al., J. Am. Chem. Soc., Vol 60, p. 309 (1938). This method depends on the condensation of nitrogen into the pores of activated silica and is useful for measuring pores with diameters up to about 600A. If the sample contains pores with diameters greater than about 600A, the pore size distribution, at least of the larger pores, is determined by mercury porosimetry as described in Ritter et al., Ind. Eng. Chem. Anal. Ed. 17,787 (1945). This method is based on determining the pressure required to force mercury into the pores of the sample. Mercury porosimetry, which is useful from about 30 to about 10,000 A, may be used alone for measuring pore volumes in silicas having pores with diameters both above and below 600A. Alternatively, nitrogen porosimetry can be used in conjunction with mercury porosimetry for these silicas. For measurement of APDs below 600A, it may be desired to compare the results obtained by both methods. The calculated PV volume is used in Equation (1).

For determining pore volume of hydrogels, a different procedure, which assumes a direct relationship between pore volume and water content, is used. A sample of the hydrogel is weighed into a container and all water is removed from the sample by vacuum at low temperatures (i.e., about room temperature). The sample is then heated to about 450 to 700° F. to activate. After activation, the sample is re-weighed to determine the weight of the silica on a dry basis, and the pore volume is calculated by the equation:

$$PV\,(\text{cc/gm}) = \frac{\%\ TV}{100 - \%\ TV}, \quad (2)$$

where TV is total volatiles, determined by the wet and dry weight differential. An alternative method of calculating TV is to measure weight loss on ignition at 1750° F., (see Equation (9) in Example II). The PV value calculated in this manner is then used in Equation (1).

The surface area measurement in the APD equation is measured by the nitrogen B-E-T surface area method, described in the Brunauer et al., article, supra. The surface area of all types of appropriately activated amorphous silicas can be measured by this method. The measured SA is used in Equation (I) with the measured PV to calculate the APD of the silica.

The purity of the amorphous silica used in this invention is not believed to be critical in terms of the adsorption of soaps and phospholipids. However, where the finished products are intended to be food grade oils care should be taken to ensure that the silica used does not contain leachable impurities which could compromise the desired purity of the product(s). It is preferred, therefore, to use a substantially pure amorphous silica, although minor amounts, i.e., less than about 10%, of other inorganic constituents may be present. For example, suitable silicas may comprise iron as $Fe_2O_3$, aluminum as $Al_2O_3$, titanium as $TiO_2$, calcium as CaO, sodium as $Na_2O$, zirconium as $ZrO_2$, and/or trace elements.

The examples which follow are given for illustrative purposes and are not meant to limit the invention described herein. The following abbreviations have been used throughout in describing the invention:

A—Angstrom(s)
APD—average pore diameter
B-E-T—Brunauer-Emmett-Teller
C—capacity
Ca—calcium
cc—cubic centimeter(s)
cm—centimeter
Cu—copper
°C—degrees Centigrade
db—dry basis
°F—degrees Fahrenheit
Fe—iron
gm—gram(s)
ICP—Inductively Coupled Plasma
m—meter
Mg—magnesium
min—minutes
ml—milliliter(s)
P—phosphorus
PL—phospholipids
ppm—parts per million (by weight)
PV—pore volume
%—percent
RH—relative humidity
rpm—revolutions per minute
S—soaps
SA—surface area
sec—seconds
TV—total volatiles
wt—weight

EXAMPLE I

(Amorphous Silica and Oil Samples)

The properties of the amorphous silica used in these examples are listed in Table II.

TABLE II

| Silica Sample | Surface Area[1] | Pore Volume[2] | Av. Pore Diameter[3] | Total Volatiles[4] |
|---|---|---|---|---|
| Hydrogel[5] | 911 | 1.8 | 80 | 64.5 |

[1]B-E-T Surface Area (SA) measured as described above.
[2]Pore Volume (PV) measured as described above using hydrogel method.
[3]Average Pore Diameter (APD) calculated as described above.
[4]Total volatiles, in weight percent (wt. %) on ignition at 1750° F.
[5]The hydrogel was obtained from the Davison Chemical Division of W. R. Grace & Co.-Conn.

The Oil Samples used in the following examples were prepared by combining Oil A (see Table III), a caustic refined soybean oil sampled after caustic treatment and primary centrifuge but before water wash, with either Oil Sample E or Oil Sample E′ degummed soybean oils prepared as described below and not subjected to caustic treatment. Oil Sample E′ was prepared in the same manner as Oil Sample E of Table III, for which analytical results are shown; insufficient quantities of Oil Sample E′ precluded separate analysis, but it is assumed that the identically degummed oils were substantially identical. Oil Sample A contained large quantities of soaps (362 ppm) determined by measuring alkalinity expressed as sodium oleate (ppm) by A.O.C.S. Recommended Practice Cc 17-79. The acid degummed oils, having not been contacted with caustic, contained no soap, but contained significant levels of phosphorus, as indicated by the values for Oil Sample E, which contained 22.0 ppm phosphorus, measured by inductively coupled plasma ("ICP") emission spectroscopy.

Oil Sample A was mixed in varying proportions (as indicated in Table III) with Oil Sample E or E′ to prepare Oil Samples B, C and D, which are relatively constant for phosphorus and associated metal ions but which contain significantly different levels of soap. Oil Sample B contained 75% Oil Sample A and 25% Oil Sample E. Oil Sample C contained 50% Oil Sample A and 50% Oil Sample E′. Oil Sample D contained 25% Oil Sample A and 75% Oil Sample E′. Each Oil Sample was analyzed as described above for trace contaminants (P, Ca, Mg, Fe and Cu) and for soaps. The results are shown in Table III.

The acid degummed oils (Oil Samples E and E′) were prepared by heating 500.0 gm oil, covered with foil and blanketed with nitrogen, in a 40° C. water bath. Next, 500 ppm 85% phosphoric acid (0.25 gm) was added to the oil and stirred for twenty minutes while maintaining the nitrogen blanket. Ten milliliters of de-ionized water was added and mixed for one hour. The sample was centrifuged at 2300 rpm for thirty minutes. The top layer was the degummed oil used in the experiment (the bottom layer, comprising the gums, was discarded).

TABLE III

| Oil | Trace Contaminants, ppm[1] | | | | | |
|---|---|---|---|---|---|---|
| Sample | P | Ca | Mg | Fe[2] | Cu[2] | Soap, ppm[3] |
| A | 13.4 | 0.93 | 1.03 | 0.02 | 0.02 | 362.0 |
| B | 19.4 | 2.08 | 1.92 | 0.00 | 0.02 | 180.0 |
| C | 20.8 | 3.04 | 2.46 | 0.06 | 0.01 | 70.0 |
| D | 23.7 | 3.84 | 3.01 | 0.07 | 0.02 | 30.0 |
| E | 22.9 | 4.27 | 3.17 | 0.11 | 0.03 | 0.0 |

TABLE III-continued

| Oil Sample | Trace Contaminants, ppm[1] P | Ca | Mg | $Fe^2$ | $Cu^2$ | Soap, ppm[3] |
|---|---|---|---|---|---|---|
| E' | * | * | * | * | * | * |

[1]Trace contaminant levels (P, Ca, Mg, Fe, Cu) measured in parts per million by ICP emission spectroscopy.
[2]Fe and Cu values reported were near the detection limits of this analytical technique.
[3]Soap measured by A.O.C.S. Recommended Practice Cc 17-79.
*Oil Sample E' was prepared from the same crude oil as Oil Sample E, and by identical acid degumming steps. Insufficient quantities of Oil Sample E' were available for analysis, but it is assumed that the values are comparable to those of Oil Sample E.

EXAMPLE II

(Treatment Of Oil Samples With Silica)

The Oil Samples prepared in Example I were treated with the amorphous silica described in Example I. For each test a 100.0 gm quantity of the Oil Sample (A, B, C, D, or E) was heated at 100° C., and the silica was added in the amount indicated in Table IV. The mixture was maintained at 100° C., while being stirred vigorously, for 0.5 hours. The silica was separated from the oil by filtration. The treated, filtered Oil Samples were analyzed for soap and trace contaminant levels by the methods described in Example I. The results, shown in Table IV, indicate that:

1. The amorphous silica adsorbent removed soaps and trace contaminants (phospholipids and associated metal ions) from the Oil Samples in a single operation.

2. Soaps appeared to be preferentially adsorbed as compared to trace contaminants. In many cases there were no soaps found in the silica treated oil, while there were considerable trace contaminants remaining in the oil.

3. The capacity of the silica adsorbent for phosphorus appeared to increase with increasing soap levels in the Oil Samples. For example, in Oil Sample A (362 ppm soap), a silica loading of only 0.15 wt. % was required to reduce the phosphorus level to well below 1.0 ppm, while in Oil Samples C, D and E (70, 30 and 0 ppm soap, respectively) silica loadings of 0.6 wt. % were required to reduce phosphorus levels to below 1.0 ppm. The presence of soaps in the oil therefore made it possible to reduce phosphorus levels to below 1.0 ppm at a much lower silica usage than was required in the absence of soaps.

The data obtained from Example II demonstrate that the capacity of amorphous silica for phospholipid and soap removal actually increases with increasing soap content of the starting oil until a maximum adsorbent capacity is approached. The maximum adsorbent capacity of the silica hydrogel used under the conditions of Example II was approximately 55 wt. % soaps plus phospholipids.

The data in Table V were calculated from Table IV in order to obtain values for the adsorption capacity of the amorphous silica. Calculations were made as follows. The capacity of the amorphous silica for combined soaps and phospholipids ($C_{S\text{-}PL}$), expressed as a percent, can be defined as:

$$C_{S\text{-}PL} = \left[\frac{\Delta S\text{ (ppm)} + \Delta PL\text{ (ppm)}}{\text{Silica } (db, \text{ wt. \%})}\right] \times 10^{-2} \quad (3)$$

where the change in concentrations of soaps and phospholipids in the oil (from before to after contact with the silica adsorbent) are defined as:

$$(4)\ \Delta S\text{(ppm)} = S\text{ (ppm)}_{initial} - S\text{ (ppm)}_{final}$$

$$(5)\ \Delta PL\text{ (ppm)} = \Delta P\text{ (ppm)} \times 30$$

$$(6)\ \Delta P\text{ (ppm)} = P\text{ (ppm)}_{initial} - P\text{ (ppm)}_{final}$$

$$\text{Silica } (db, \text{ wt. \%}) = \frac{\text{Silica } (db, \text{ gm})}{\text{Oil (gm)}} \times 100 \quad (7)$$

where "Silica (db, gm)" is the weight in grams of the silica after ignition at 1750° F.

$$\text{Silica } (db, \text{ wt. \%}) = \text{Silica (as is, gm)} \times \frac{100 - TV}{100} \quad (8)$$

$$TV = 100 \times \left[\frac{\text{Silica (as is, gm)} - \text{Silica } (db, \text{ gm})}{\text{Silica (as is, gm)}}\right] \quad (9)$$

The capacity of the amorphous silica for phospholipids alone ($C_{PL}$), expressed as a percent, can be defined as:

$$C_{PL} = \frac{PL\text{ (ppm)}}{\text{Silica } (db, \text{ wt. \%})} \times 10^{-2} \quad (10)$$

The calculated values for changes in phosphorus (P), phospholipids (PL) and soap (S), combined phospholipid and soap (S-PL) remaining in the oil, capacity for combined soap and phospholipid ($\%C_{S\text{-}PL}$) are given in Table V for each of the treated Oil Samples, along with starting phosphorus and soap values. The data from Table V were plotted in FIG. 1 in the form of adsorption isotherms, with the wt. % phospholipids and soaps adsorbed on the silica (ΔS-PL) plotted on the ordinate versus the amount of soap and phospholipid remaining in the adsorbent-treated oil (Remaining S-PL) plotted on the abscissa. The data were plotted in this manner in order to correct for the phenomena typically observed for adsorption of increasing capacity (up to some plateau value as a result of saturation) with increasing adsorbate remaining in the treated material. This phenomenon is predicted from equilibrium considerations.

Figure 2:
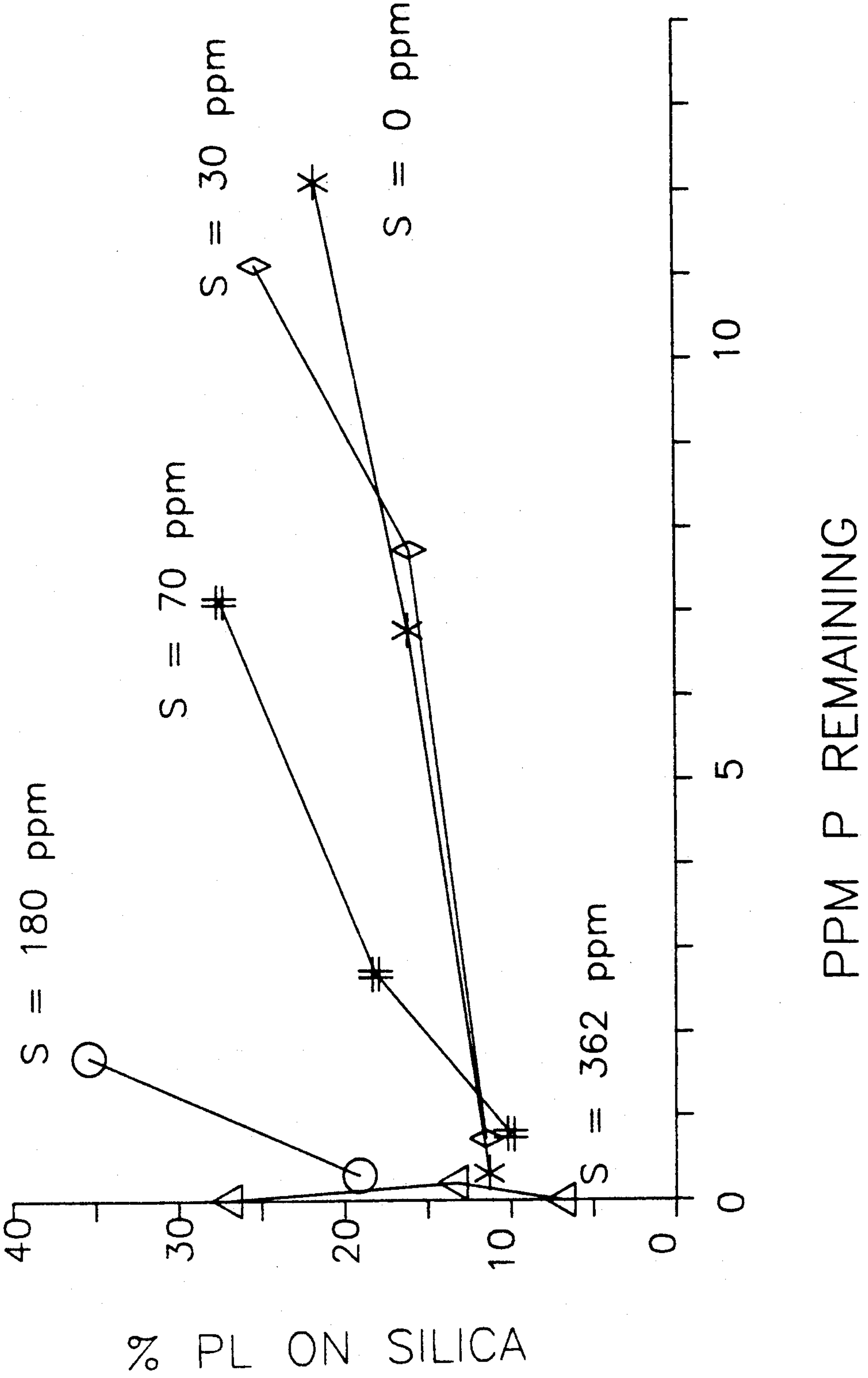
FIG. 2 is a graphic representation of adsorption isotherms for the capacity of amorphous silica for phospholipids, for treated oil with ≦30 parts per million residual soap. The isotherms are based on the results of Example II as shown in Table V.

The data from Table V were also plotted in FIG. 2 in the form of adsorption isotherms, with the wt. % phospholipids adsorbed on the silica (ΔPL) plotted in the ordinate versus the amount of phosphorus remaining in the adsorbent-treated oil (P) plotted on the abscissa. FIG. 2 shows data for adsorbent-treated Oil Samples with ≦30 ppm residual soaps.

The data from Table V and FIGS. 1 and 2 indicate the following:

1. The capacity of the silica for phospholipid and soaps tends to increase with increasing levels of soap in the starting oil.

2. Increasing soap content on the silica tends to increase the phospholipid capacity of the silica when the soap content in the treated oil has been significantly reduced for example, in this case, about 30 ppm soap, as demonstrated in Table V and FIG. 2, for these Oil Samples and this adsorbent.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

TABLE IV

| | | Trace Contaminant Levels ppm | | | | | |
|---|---|---|---|---|---|---|---|
| Oil | Wt. % Silica | P | Ca | Mg | Fe | Cu | Soap, ppm |
| A | — | 13.4 | 0.927 | 1.03 | .019 | .020 | 362.24 |
| A | 0.05 | 13.2 | 1.24 | 1.40 | .0161 | .0549 | 82.18 |
| A | 0.08 | 9.49 | 1.58 | 1.30 | .0497 | .0142 | 42.62 |
| A | 0.15 | .013 | .016 | .021 | .027 | .014 | 0 |
| A | 0.30 | .21 | .021 | .029 | 0 | .006 | 0 |
| A | 0.6 | .002 | .045 | .023 | .128 | .026 | 0 |
| B | — | 19.4 | 2.08 | 1.92 | 0 | .0219 | 179.59 |
| B | 0.08 | 4.83 | .643 | .512 | .0683 | .148 | 30.44 |
| B | 0.14 | 1.70 | .458 | .431 | .0805 | .0258 | 0 |
| B | 0.3 | .297 | .160 | .137 | 0 | .0211 | 0 |
| C | — | 20.8 | 3.04 | 2.46 | .063 | .012 | 120.50 |
| C | 0.15 | 7.11 | 1.72 | 1.35 | .070 | .020 | 0 |
| C | 0.3 | 2.69 | 1.01 | .799 | 0 | .014 | |
| C | 0.6 | .78 | .518 | .351 | 0 | .010 | 0 |
| D | — | 23.7 | 3.84 | 3.01 | .078 | .015 | 30.00 |
| D | 0.15 | 11.1 | 3.18 | 2.51 | .025 | .012 | 0 |
| D | 0.3 | 7.72 | 2.63 | 2.00 | .066 | .015 | 0 |
| D | 0.6 | .072 | .396 | .335 | .407 | .076 | 0 |
| E | — | 22.9 | 4.27 | 3.17 | .110 | .0306 | 0 |
| E | 0.15 | 12.1 | 3.63 | 2.87 | .0713 | .0447 | 0 |
| E | 0.3 | 6.77 | 2.59 | 1.99 | .396 | .0732 | 0 |
| E | 0.6 | .319 | .0847 | .0532 | 0 | .0164 | 0 |

TABLE V

| Oil | Wt % $SiO_2$ | P (ppm) | S (ppm) | ΔP (ppm) | ΔPL (ppm) | ΔS (ppm) | ΔS-PL (ppm) | Remaining S-PL (ppm) | %C S & PL | %C PL |
|---|---|---|---|---|---|---|---|---|---|---|
| A | — | 13.4 | 362 | — | — | — | — | — | — | — |
| A | 0.05 | 13.2 | 82 | 0.2 | 6 | 280 | 286 | 396 | 57.2 | 1.2 |
| A | 0.08 | 9.49 | 43 | 3.9 | 117 | 319 | 436 | 285 | 54.5 | 14.7 |
| A | 0.15 | .013 | 0 | 13.4 | 402 | 362 | 764 | 0 | 50.9 | 26.8 |
| A | 0.3 | .21 | 0 | 13.2 | 396 | 362 | 758 | 6 | 25.3 | 13.2 |
| A | 0.6 | .002 | 0 | 13.4 | 402 | 362 | 764 | 0 | 12.7 | 6.7 |
| B | — | 19.4 | 180 | — | — | — | — | — | — | — |
| B | 0.08 | 4.83 | 30 | 14.6 | 437 | 150 | 587 | 145 | 73.4 | 54.6 |
| B | 0.15 | 1.7 | 0 | 17.7 | 531 | 180 | 711 | 51 | 47.4 | 35.4 |
| B | 0.3 | .297 | 0 | 19.1 | 573 | 180 | 753 | 9 | 25.1 | 19.1 |
| C | — | 20.8 | 70 | — | — | — | — | — | — | — |
| C | 0.15 | 7.11 | 0 | 13.7 | 411 | 70 | 481 | 213 | 32.0 | 27.4 |
| C | 0.3 | 2.69 | 0 | 18.1 | 543 | 70 | 613 | 81 | 20.4 | 18.1 |
| C | 0.6 | .78 | 0 | 20.0 | 601 | 70 | 671 | 23 | 11.2 | 10.0 |
| D | — | 23.7 | 30 | — | — | — | — | — | — | — |
| D | 0.15 | 11.1 | 0 | 12.6 | 378 | 30 | 408 | 333 | 27.2 | 25.2 |
| D | 0.3 | 7.72 | 0 | 16.0 | 479 | 30 | 509 | 232 | 17.0 | 16.0 |
| D | 0.6 | .72 | 0 | 23.0 | 689 | 30 | 719 | 22 | 12.0 | 11.5 |
| E | — | 22.9 | 0 | — | — | — | — | — | — | — |
| E | 0.15 | 12.1 | 0 | 10.8 | 324 | 0 | 324 | 363 | 21.6 | 21.6 |
| E | 0.3 | 6.77 | 0 | 16.1 | 484 | 0 | 484 | 203 | 16.1 | 16.1 |
| E | 0.6 | .319 | 0 | 22.6 | 677 | 0 | 677 | 10 | 11.3 | 11.3 |

We claim:

1. In a substantially solvent-free process for refining a glyceride oil, said oil containing free fatty acid and phospholipid, said process comprising:

(a) treating said oil with a base to neutralize said free fatty acid, thereby forming soap, (b) centrifuging said treated oil to remove a major portion of said soap and said phospholipid from said oil, thereby producing a partially refined oil and concentrated soapstock, (c) washing said partially refined oil with water, and (d) centrifuging said water-washed oil to further remove soap and phospholipid from said oil, thereby producing a further refined glyceride oil and dilute aqueous soapstock, THE IMPROVEMENT COMPRISING: (i) contacting said partially refined oil with an amorphous silica adsorbent whereby substantially all of the remaining soap and substantially all of the remaining phospholipid are adsorbed by said silica, and (ii) separating said silica, said adsorbed phospholipid and said adsorbed soap from said adsorbent-treated oil, whereby said water washing step (c) and centrifuging step (d) are eliminated and the formation of dilute aqueous soapstock is avoided.

2. The process of claim 1 in which said glyceride oil is soybean oil.

3. The process of claim 1 in which said selected glyceride oil comprises at least 300 parts per million soaps.

4. The process of claim 1 in which the adsorbent-treated glyceride oil has a soap content of below about 50 parts per million.

5. The process of claim 4 in which the adsorbent-treated glyceride oil has a soap content of below about 10 parts per million.

6. The process of claim 5 which reduces the soap content of the adsorbent-treated glyceride oil to substantially zero parts per million.

7. The process of claim 1 wherein the adsorbent-treated glyceride oil has a phospholipid level, expressed as phosphorus content, below about 15 parts per million.

8. The process of claim 7 wherein the phosphorus content is below about 5 parts per million.

9. The process of claim 8 wherein the phosphorus content is below about 1 part per million.

10. The process of claim 1 in which said amorphous silica has an effective average pore diameter of greater than 60 Angstroms.

11. The process of claim 10 in which said average pore diameter is between about 60 and about 5000 Angstroms.

12. The process of claim 10 in which at least 50% of the pore volume of said silica is contained in pores of at least 60 Angstroms in diameter.

13. The process of claim 1 in which said amorphous silica is characterized by an artificial pore network of interparticle voids having diameters of about 60 to about 5000 Angstroms.

14. The process of claim 13 in which said amorphous silica is a silica having an intraparticle average pore diameter of less than about 60 Angstroms.

15. The process of claim 13 in which said amorphous silica is fumed silica.

16. The process of claim 13 in which said silica gel is a hydrogel.

17. The process of claim 1 in which said amorphous silica is a partially dried hydrogen which has an effective average pore diameter of between about 20 Angstroms and about 60 Angstroms and a moisture content of at least about 25 weight percent.

18. The process of claim 1 in which said amorphous silica is selected from the group consisting of silica gels, precipitated silicas, dialytic silicas, and fumed silicas.

19. The process of claim 1 in which said oil is contacted with 0.1 weight percent to about 1.0 weight percent amorphous silica, dry basis.

20. The method of claim 1 in which said silica is contained in a packed bed.

21. In a substantially solvent-free process for refining a glyceride oil, said oil containing free fatty acid and phospholipid, said process comprising:

(a) treating said oil with a base to neutralize said free fatty acid, thereby forming soap, (b) centrifuging said treated oil to remove a major portion of said soap and said phospholipid from said oil, thereby producing a partially refined oil and concentrated soapstock, (c) washing said partially refined oil with water, and (d) centrifuging said water-washed oil to further remove soap and phospholipid from said oil, thereby producing a further refined glyceride oil and dilute aqueous soapstock, THE IMPROVEMENT COMPRISING: (i) contacting said treated oil from step (a) with an amorphous silica adsorbent whereby substantially all of said soap and said phospholipid are adsorbed by said silica, and (ii) separating said silica, said adsorbed phospholipid and said adsorbed soap from said adsorbent-treated oil whereby said step (b)-(d) are eliminated and the formation of soapstock is avoided.

* * * * *